INVENTORS.
GEORGE A. GIANNUZZI
DONALD W. HANEY
BY K. P. Johnson
ATTORNEY

United States Patent Office 3,427,962

Patented Feb. 18, 1969

3,427,962

FLUID CONTROL MEANS FOR ZERO SUPPRESSION IN PRINTING AND SENSING DEVICES

George A. Giannuzzi and Donald W. Haney, Vestal, N.Y., assignors to International Business Machines Corporation, Armonk, N.Y., a corporation of New York Filed July 14, 1965, Ser. No. 471,987

U.S. Cl. 101—93 18 Claims

Int. Cl. B41j *5/30;* F15c *1/12;* G06m *3/14*

This invention relates generally to apparatus for translating coded information into representative printed characters, and more particularly to apparatus for selectively suppressing the translation of a designated character when encountered in a coded document.

Portions of the apparatus herein described have been described and claimed in an application for Letters Patent by C. J. Fitch, filed June 18, 1964, bearing Ser. No. 376,189, and assigned to the assignee of this application.

Machine processing of business documents such as punched cards, frequently involves interpreting the coded data recorded on the document and controlling recording apparatus to print the equivalent alphabetic or numeric characters on the same or another document. Generally, the documents are passed successively through the machine and the punched data in selected document fields is interpreted without regard to the suppression of designated characters. The record documents are often provided with a field or fields comprising a predetermined number of columns in which entries are made and each column is provided with one or more perforations. When the amount punched in any field has fewer places than the capacity of the field, the remaining columns are usually perforated with zeros. It is, however, highly desirable during interpretation to suppress the printing of zeros to the left of the highest significant digit to provide an easily readable document.

The suppression of zeros is relatively easy in parallel machines since all the document columns are read concurrently. Each column has its own sensing and printing apparatus, either of which can be disabled upon the occurrence of a punched zero. However, in serially operated machines where the document passes through the machine column by column, there are provided only one sensing and one printing element for each character. Each of these elements must be operable to translate punched zeroes where desired and then inoperable for the zeros which are to be omitted.

The alternate enabling and disabling of the printing or sensing element for the zero must, therefore, be coordinated with the position and timing of the document in order to accurately suppress the desired character. The selective operation of the translating and printing devices further demands rapid and reliable control. It will be noted that the location of a suppressed zero in one format may be different than that in another format. Thus, the selection of disabling and enabling control is required to be adapted for alteration according to the format used.

Accordingly, it is a primary object of this invention to provide apparatus for selectively suppressing the interpretation of zeros and in a serially operating interpreter in designated data columns of a document.

Another object of this invention is to provide zero suppression apparatus for a fluid-operated interpreting mechanism.

A still further object of this invention is to provide apparatus for suppressing the printing of zeros in a fluid-operated interpreter, which apparatus can be rendered automatically ineffective upon the detection of a significant digit or blank in the document column.

Yet another object of this invention is to provide fluid controlled zero suppression apparatus for an interpreting mechanism which can be repetitively actuated during the processing of a single record document.

The invention accomplishes the foregoing objects by providing fluid-actuated translation means which sense the document perforations for the zero character and supply a fluid pressure recording signal to recording means. Connected intermediate the translation and recording means is a valve means operable for transmitting the recording signals and movable to a position blocking the transmission in response to a zero suppression initiating signal from a control means. The control means is adapted for variable designation of document data columns in each data field in which zero suppression is to occur. A suppression initiating signal is generated by the control means for the first column in a designated field and causes the movement of the valve means to the blocking position. Subsequent hold signals in conjunction with the zero code perforations maintain the valve means in the blocking position. The valve means will remain in this position as long as a zero code is sensed and hold signals are generated. When no zero code is detected in a column, the valve means is biased to move into the transmitting mode and any subsequently detected zeros are printed by the recording means. Thus the sensing of a high order significant digit in a field overrides the control means so that subsequent zeros in the field can be sensed and recorded.

The invention has the feature of using a simple, easily prepared disc in the control means which can be selectively perforated to provide zero suppression initiating and hold signals for any desired document format. The control disc is also adapted to provide a suppression termination signal to prevent further suppression in an adjacent subsequent field in the event that the first field contained all zeros which have already been suppressed.

The foregoing and other objects, features and advantages of the invention will be apparent from the following more particular description of a preferred embodiment of the invention, as illustrated in the accompanying drawings, wherein.

Figure 1:
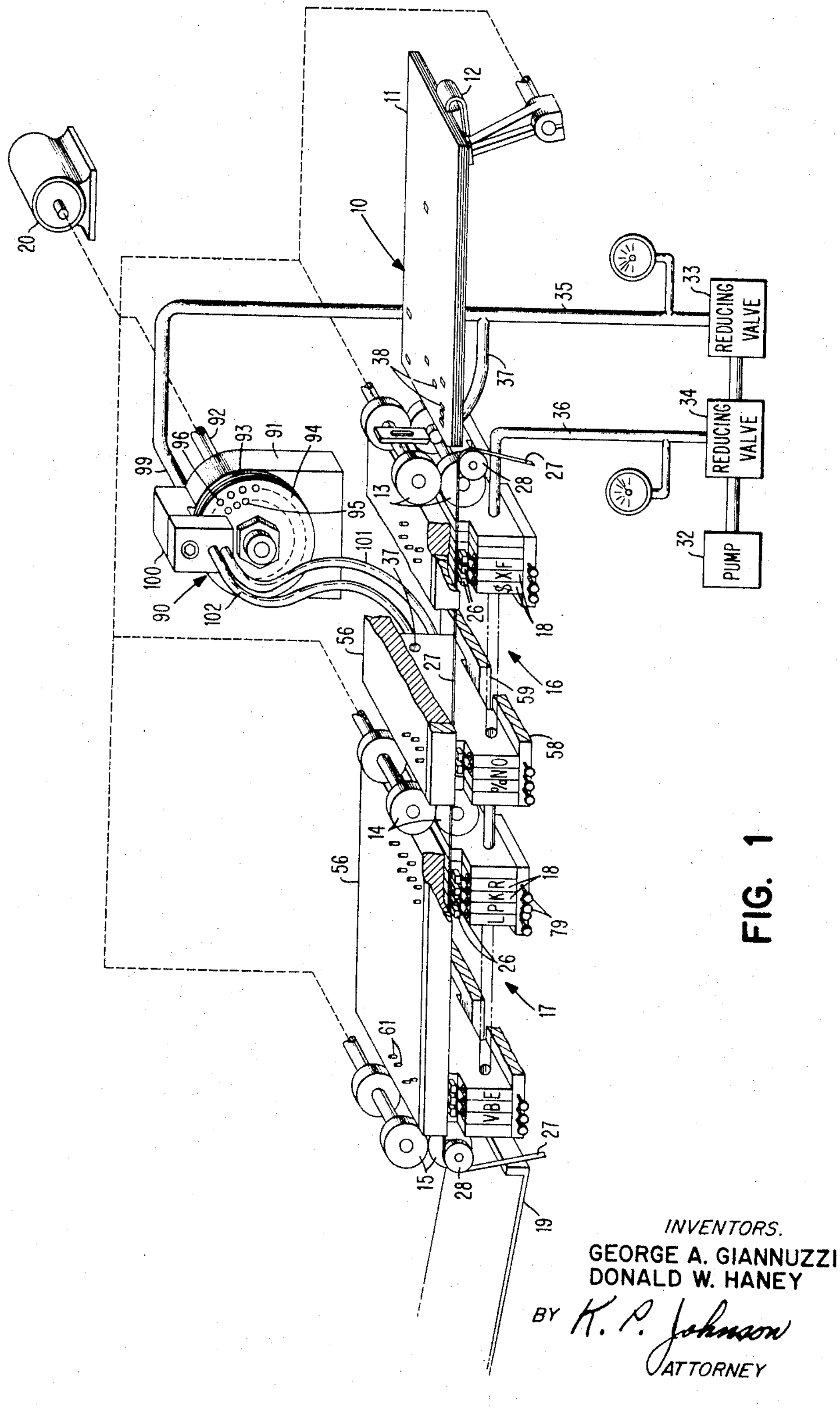
FIGURE 1 is a perspective schematic view of fluid-operated interpreting mechanism in conjunction with a zero suppression control apparatus therefor in accordance with the invention.

Referring to FIG. 1, the fluid-operated interpreter apparatus, which is to be selectively controlled, comprises generally a hopper 10 for receiving a stack of perforated record documents 11, an oscillatory feeding knife 12, feed roll pairs 13, 14 and 15 for transporting the documents, a first and second plurality 16 and 17 of combined decoding and recording modules 18, and a stacker pocket 19 for receiving the interpreted documents. The feed knife and feed roll pairs are driven by a motor 20 through any suitable mechanical coupling indicated by the broken lines. Although the interpreter and decoding modules 18 have been shown and described in the aforementioned patent application, they will be described herein in conjunction with the zero suppression apparatus.

The documents are fed singly and in serial fashion column by column by picker knife 11 which pushes a document into the grip of rotating feed rolls 13 so that the document is then driven through the decoding slot of modules 18 of first plurality 16. Upon emerging from the first plurality of modules, the leading edge of the document is gripped by feed rolls 14 and the process is repeated for plurality 17, whereupon feed rolls 15 drive the document into the stacker. The decoding modules 18 are divided into two pluralities to permit feed rolls 14 to be interposed between the remaining sets of feed rolls in the event the documents being processed are too short to extend between the latter feed rolls.

As a document passes through the decoding slots of the modules, each module senses each document column for a particular and unique arrangement of perforations therein. For purposes of explanation, it is assumed that the documents being decoded are well-known tabulating cards each containing 80 data columns with each column having 12 index positions, any of which can contain a perforation. When one of the modules 18 senses its unique columnar arrangement of perforations, it responds by actuating a print hammer 26 upward against a conventional ink ribbon 27, leaving an impression for that card column along the underside of the top margin of the card. Hammer 26 has a character engraved on its top surface which corresponds to the perforation arrangement of the document column and has a flat surface adjacent the module to prevent rotation during operation. Ink ribbon 27 may be driven over idler rolls 28 by any well known means.

The translation of a columnar arrangement of perforations into printed characters is accomplished by sensing the presence and absence of holes with a pressurized fluid such as air. The air is supplied from a conventional pump 32 to pressure reducing valves 34 and 33. The air from valve 34 is at a high pressure, approximately 8 p.s.i.g., and the air from valve 33 is at a lower pressure, approximately 3 p.s.i.g. The air is supplied through respective ducts 36 and 35 to the decoding modules 18. High pressure air is used to actuate the print hammer and the lower pressure air is used to sense the perforations in the document columns.

The interpretation of document columns is accomplished by decoding modules 18 as explained in the above-mentioned patent application and need not be described here in detail. The structure and operation of the zero code plate, to be explained below, is somewhat similar, however, to that for the decoding modules of the remaining characters.

Figures 2, 3, 4, 5, 6:
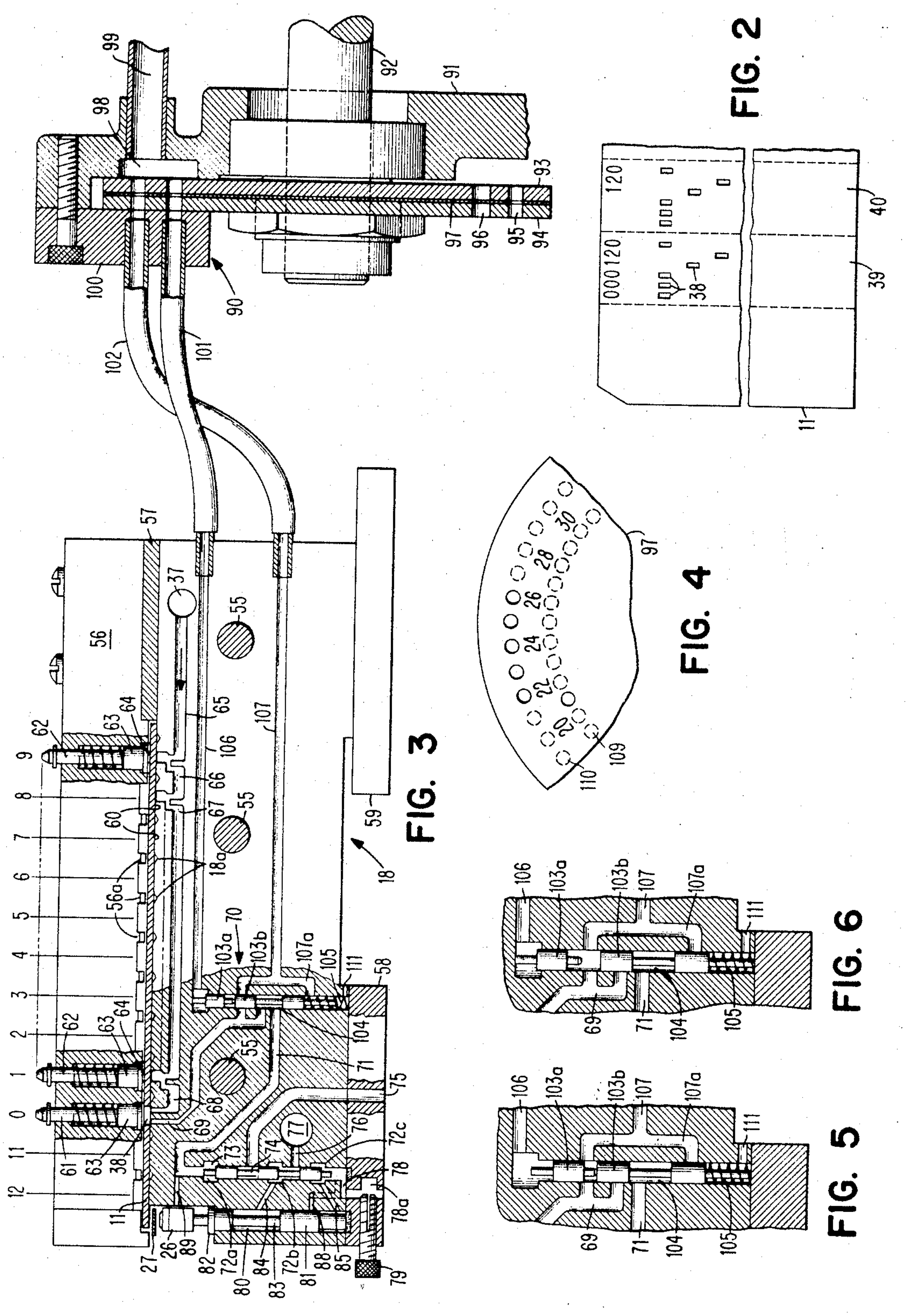
FIGURE 2 is a plan view of a portion of a record document illustrating the non-suppression and suppression of zeros in data fields.
FIGURE 3 is a detail elevation view of the zero translating code plate showing the recording signal transmission valve in conjunction with the fluid supply control device therefor shown in section.
FIGURE 4 is a partial elevation view of the control disc used in the control device in FIG. 3.
FIGURES 5 and 6 are enlarged partial elevation views of the signal transmission valve of FIG. 3 illustrating valve positions during zero suppression.

In FIG. 2, a portion of a record document 11 has columnar perforations 38 punched therein to represent data. The document contains two data fields 39, 40, each bounded by a pair of dotted lines. In field 39, all characters represented by the punched holes in the field are printed along the top margin of the document. Zeros are often punched in columns which are to contain no significant digit in order to provide a check on the machines when the documents are machine processed. However, when such zero punches are interpreted and printed, reading the information is somewhat difficult so it is desirable to suppress the unnecessary zeros. In data field 40, the same pattern of perforations is present as shown in field 39 but the zeros to the left of the most significant digit have been suppressed while the zero to the right has not been suppressed. The capability of zero suppression thus permits the simplification of interpreted record documents.

Character sensing or decoding is accomplished by attempting to pass a pressurized fluid signal serially through a plurality of fluid-conveying ducts formed in one surface of each module 18. The detailed arrangement of the zero decoding module is shown in FIG. 3. The module is constructed of a substantially rectangular block of material having uniquely arranged ducts formed therein which convey fluid signals from a supply manifold to a control valve. The ducts are formed in one surface of the module and the module is then assembled on tie rods 55 with other decoding modules and formed into pluralities of modules such as 16 and 17. The blank surface of one module serves as the cover for the duct surface of an adjacent module. Each module plurality has a common upper plate 56 separated from the module by guide strip 57. Base strips 58 and 59 are also common to all modules in a plurality. Upper plate 56 is formed with ribs 56*a* depending therefrom over the document path and the upper document surface 60 of each module 18 is provided with grooves 18*a* therein. The ribs and aligned grooves provide a slot through which the document passes normal thereto. The ribs maintain the document against the decoding surface 60 of the module and the grooves permit the escape of any pressurized fluid from those modules where required.

In order to hold a document tightly against sensing surface 60 there are provided two types of pressure pins 61 and 62. Pressure pin 61 has a smooth surface at the underside of base portion 63 while the underside of the base portion of sensing pins 62 is cut out as at 64. Pin 61 blocks the flow of air in the event there is a document hole thereunder or no document present, while cutout 64 in a pin 62 permits the escape of air to atmosphere in the event there is a hole or no document is present. All pressure pins are spring biased downwardly to contact document 11 thereunder and urge the document against sensing surface 60 by means of the enlarged base portions 63. The bottom edges of all base portions 63 are chamfered so they can be forced upwardly by the edge of a document passing along decoding surface 60, moved by feed roll pairs 13, 14.

The decoding module must respond only to its unique arrangement of columnar holes and no other. The zero module illustrated is to respond only upon sensing a single hole which appears at the 0 index position. However, since a document column may contain a hole in other index positions in addition to that at the 0 index position, this module must have the ability to distinguish between a combination of holes and remain inactive until a hole appears only in the 0 index position.

Low pressure fluid is supplied to duct 65 from manifold 37 and flows in the direction of the arrow. The down stream end of the duct terminates at the 9 index position of the module at decoding surface 60. A second duct 66 has its upstream end joining duct 65 at substantially right angles thereto near the 9 index position. These two ducts form a venting junction which prevents the sensing of subsequent holes in the document column if duct 65 is opened to atmosphere, as will be explained hereinafter. The downstream end of duct 66 terminates at the 8 index position adjacent the upstream end of a succeeding duct 67. The junction between ducts 67 and 66 is identical to that between ducts 66 and 65. In the zero decoding module each index position from 9 through 1 is provided with a venting junction which will disable the operation of the decoding module whenever a hole is sensed in those index positions. The decoding module is constructed in this manner because of the possible combination of a hole in these positions with a 0 perforation. Each of the venting junctions in index positions 7 through 2 have not been shown because of the identical structure at each index position. Thus, duct 67 terminates at its downstream end at the 1 index position and a duct 68 has its upstream end connected thereto at right angles. The downstream end of duct 68 terminates at the 0 index position on decoding surface 60. The upstream end of a subsequent duct 69 terminates at the 0 index position adjacent duct 68 and extends from that position to a zero suppression control valve indicated generally as 70. With the valve in the position shown, any fluid flowing in duct 69 is directed to a duct 71 through a portion of valve 70, and flows to recording valve chamber 73.

During sensing, the module is activated when a fluid pressure signal is transmitted from duct 65 to spool valve chamber 73. If a document column, therefore, has no hole at index positions 9 through 1 then fluid will be directed from duct 65 into each subsequent duct 66, 67, etc. into duct 68. If there is a hole at the 0 index position, the fluid in duct 68 will flow upward into a perforation 38 where flow is directed by pressure pin portion 63 to flow in duct 69 to the zero suppress valve 70 and into channel 71. The pressure pulse present in channel 71 will thus be supplied to chamber 73 which will ultimately produce recordation of a zero character on the document. If, however, a perforation occurred at any index position of 9 through 1, fluid supplied in duct 65 originally would be bled off to the atmosphere through the perforation and cutout 64 at the bottom of one of pressure pin base portions 63. Fluid flowing out of a perforation at index position 9, for example, would create a reduction of pressure in duct 67 because of the venturi effect at the junction. Thus, no signal would have ultimately reached channel 69. In this way the zero code plate 18 will respond to a document column having a perforation only in the 0 index position. Perforations at other locations will disable the sensing module by exhausting the fluid from manifold 37 to atmosphere.

Chamber 73 in each module has a spool valve 74 therein with 3 lands formed thereon. The valve chamber is provided with 3 annular ports **72*a*, 72*b* and 72*c*. A duct 75 is provided between ports 72*a* and 72*b* which communicates with the atmosphere. Between ports 72*b* and 72*c* is a duct 76 which communicates with a manifold 77 that is, in turn, commonly aligned with identical holes from other code plates and ultimately connected to high pressure duct 36 of FIG. 1. The spool valve chamber is closed at the bottom by supporting plate 58 common to all code plates, and has a channel 78 that communicates with atmosphere through port 78*a* in plate 58. An adjustable screw 79 is threadedly inserted in plate 58 and is used to vary the restriction in exhaust channel 78*a***.

At the left of the spool valve chamber there is a recording means which includes chamber 80 closed at the top by bushing 82 and at the bottom by plate 58 and having therein a movable print piston 81. The print piston is fixed on shaft 83 which is secured to print hammer 26 having, in this case, the character 0 engraved on the top surface thereof. A duct 84 communicates with annular port **72*b* and chamber 80 above the upper limit of travel of the print piston. Another duct 85 communicates with port 72*c* and chamber 80 below the extreme downward travel of piston 81**. The print piston is formed with a smaller diameter extension underneath which serves to limit its downward travel. Both the piston and spool valve, when moved downward contact a resilient material to reduce bounce.

When the spool valve is in the static position as shown, the high pressure fluid from port 77 exerts both an upward and downward force against the center and bottom lands of the valve and is effective through channel 84 to urge piston 81 down. The valve lands are each slightly smaller than the chamber diameters so that the high pressure fluid from manifold 77 leaks past each of the lands. When the high pressure fluid passes upward it exhausts to atmosphere through channel 75 and exerts no axial force on the spool. Fluid leaking downward also exhausts to atmosphere through channels 78 and **78*a*. The screw in channel 78*a* is adjusted to restrict the duct so that a pressure higher than atmospheric exists under the bottom land to cause valve 74 to remain in the upward position. The high pressure fluid from duct 84 urges the print piston down and fluid beneath the piston exhausts to atmosphere in duct 85, port 72*c* and ducts 78 and 78*a***.

When a proper arrangement of holes is sensed as indicated by fluid flow from the fluid pressure in ducts 69 and 71, the pressure is sufficient to drive the spool valve 74 down thereby venting the cavity above piston 81 to atmosphere via duct 84, ports **72*b* and duct 75. The high pressure fluid from manifold 77 and duct 76 is then applied through duct 85 to the bottom of print piston 81. This forces the piston and print hammer 26 upward against ribbon 27 and the margin of document 11** to record the character on the top margin for the column sensed.

The movement of the print piston upward exposes a feedback duct 88 which connects with duct 78 so that the high pressure fluid below the piston increases the pressure under the spool valve forcing it up to the position shown. This movement of the spool valve again supplies the pressurized fluid through duct 76, port **72*b* and duct 84 to the cavity above the print piston causing it to move downward. The control valve and print piston are now ready to be actuated again when the proper arrangement of holes occurs in a column. The sensing and printing take place while the document is in motion. It will be noted that a small direct vent 89 is provided for duct 71 which leads to atmosphere adjacent print hammer 26**. The purpose of the vent is to avoid static pressure build-up above the spool valve which would cause possible erratic operation.

The elective suppression of the zero decoding module is accomplished by means of zero suppression valve 70 and controlled impulse generator indicated generally as 90. The generator provides fluid pressure pulses to the valve which initiate, maintain or terminate zero suppression as desired. The control pulse generator comprises a housing 91, suitably supported either on or adjacent the interpreting mechanism and has a shaft 92 rotatably supported therein which is connected through well known mechanical linkage to the source 20 of rotational power. The shaft 92 is connected with the mechanical drive of the interpreting apparatus so as to move in synchronism therewith, as illustrated in FIG. 1. Secured to the shaft for rotation therewith is a pair of circular, rigid plates 93, 94 having two concentric rings of aligned hole pairs 95, 96, respectively, formed near the periphery thereof. A disc 97 is supported between the plates and is imperforate except at selected pairs of holes. The location of perforations in the disc will be described subsequently.

The disc is located in housing 91 so that disc 93 moves adjacent a supply chamber 98 formed in the housing. Chamber 98 is connected to the low pressure fluid supply through a suitable duct 99. On the opposite side of the discs 93, 94 from the supply chamber is provided a bracket 100 which is suitably secured to housing 91. The bracket supports a pair of ducts 101, 102 which are, in turn, connected with zero decoding module 18. Bracket 100 and housing 91 are formed to provide a substantially airtight seal with discs 93, 94 as the discs rotate between the supply chamber and bracket. It will thus be seen that, with fluid supplied continuously at chamber 98, a pressure pulse will be generated in ducts 101 and 102 whenever imperforate disc 97 has a hole therein in alignment with a pair of aligned holes in rotating plates 93, 94. By appropriately placing perforations in disc 97, control pulses can be generated so that they occur at preselected data columns in a record member as it moves through the zero decoding module. In this maner, the module can be controled to be operable or inoperable in response to a zero code in a document column.

Suppression control valve 70 comprises a two-part spool valve **103*a*, 103*b* movable in chamber 104. A spring 105 urges the spool valve to the position shown and the travel of the valve is limited by a reduced portion above the land at the top of valve 103*a* in FIG. 3. With the valve in this position, fluid pulses occurring in duct 69 as a result of sensing a document, will be directed against valve portion 103*b* and also into duct 71 via chamber 104**.

When the zeros of a predetermined data field are to be suppressed, disc 97 is prepared by punching out selected areas in alignment with holes 95, 96 in plates 93, 94. The plates preferably have a pair of holes corresponding to each column on the document and are identified so that the imperforate disc 97 may be easily prepared to indicate the start of a suppression field and termination of the field. A portion of the disc is shown in FIG. 4 in which, for example, suppression is to occur from column 21 through column 26. Suppression is initiated by providing a hole in the lower arc 109 at column 21. In this example any zeros occurring to the left of significant digits in columns 22, 23, 24, 25 and 26 are also to be suppressed; therefore, holes to maintain suppression are punched in the outer arc 110 in these positions. In order to terminate the suppression of zero decoding module at column 27, this column is left intact in the outer arc of control positions. Upon preparation of the flexible disc which may be of paper or thin plastic film, bracket 100 is removed from the housing 91 and circular plate 96 is removed from shaft 92. The plates may be held on shaft 92 by any conventional means such as a threaded nut. Disc 97 is then placed between plates 93 and 94 and the nut and bracket are replaced. Disc 97 is oriented so that the holes for columns 21 through 27 are aligned with the appropriate holes in the plates corresponding to those document columns.

When the control disc has been assembled in pulse generator 90, documents to be interpreted can then be fed through the machine. The impulse generator 90 is timed to rotate so that the holes 95, 96 corresponding to a designated document column, reach alignment with ducts 101 and 102 approximately when the blank document area intermediate the designated column and a preceding column reaches alignment with the terminating point of ducts 68, 69 in the zero decoding module in FIG. 3. In other words, the pulse from generator 90 should lead the corresponding column at the decoding module by approximately one-half column. Since column 21 of the disc permits a pulse to be generated in duct 101 just prior to the sensing of document column 21, pressure pulse is generated in ducts 101 and 106. The pressure moves two-part spool valve 103 down to the position shown in FIG. 5. This movement blocks transmission of any pulse from duct 69 to duct 71 when document column 21 is sensed. The columnar pulse in duct 69, however, can now flow into ducts 107 and 102, where duct 102 is blocked by an imperforate portion of plate 94. The zero sensing pulse pushes spool valve portion **103*a* up and holds portion 103*b* down as shown in FIG. 6. Upon continued movement of document 11 through the zero decoding module, the pulse in duct 69 terminates, but a pressure pulse appears in duct 102 coming from chamber 98 through the outer hole ring 110 for column 22 in disc 97. This pressure pulse flows in channel 107 maintaining spool valve portion 103 down and flows into duct 69 and is blocked by an imperforate document portion. However, as the pulse in duct 107 terminates due to the movement of pulse generator, the zero sensing pulse for column 22 reverses fluid flow in duct 69 and spool valve 103*b* is still maintained down by the pulse from the document. It will thus be seen that as long as successive zeros occur in document columns and successive holes are punched in disc 97 in the outer ring, spool valve portion 103*b* will be held down by alternating pulses blocking any fluid flow from duct 69 to duct 71**.

Since spool valve **103*b* is controlled by the alternation of pulses from generator 90 and from document 11, the absence of a zero perforation in the document will block a pressure pulse in duct 69 in the absence of a pulse in duct 107 and permit spool valve portion 103*b* to rise because of spring 105. The restoration of a spool valve thus connects duct 69 again with duct 71 and the decoding module can operate to record further zeros when sensed. In the event that no significant digit or blank column occurred in the data field in which suppression was to take place, the failure to punch a hole in disc 97 at, for example column 27, will also permit spool valve portion 103*b* to rise at the termination of a pressure pulse in duct 69. The decoding and recording of zero may be again started by a significant digit in the document or by neglecting to punch a perforation in the outer ring of disc 97. It will be noted that superfluous holes may be made in the outer ring of disc 97 and that these holes will be of no effect although pressure pulses occur in duct 107. It will also be noted in FIGS. 3, 5 and 6 that the duct branches near suppression valve 70 so that fluid pressure pulses are delivered underneath spool valve portion 103*b*. The branch duct communicates with a small orifice 111 through chamber 104** which is open to atmosphere. The orifice permits bleed-off of residual pressure in the duct and chamber to prevent static pressure build-up.

Impulse generator 90, as stated above, is synchronized for movement with a document in column by column relationship. Since successive documents are spaced during feeding from the hopper, plates 93, 94 are formed with blank areas to correspond with the document interval. It will be evident that the plates of the impulse generator may be of sufficient size to accommodate the columns and intervals of two or more documents during a single revolution of the plates. The shape and size of the holes in these plates and in disc 97 can also be modified to provide the pulse duration desired in ducts 101 and 102.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a machine for translating coded indicia in a document into character representation, apparatus for selectively suppressing the translation of a designated character comprising:

translation means including a predetermined duct arrangement and operable by the flow of pressurized fluid supplied thereto for sensing said document and recording said character in response to detecting indicia representative thereof;

means for selectively issuing a suppression signal when said character is to be suppressed; and valve means interconnected in said predetermined duct arrangement and movable in response to said suppression signal for altering said duct arrangement to render said translation means inoperable.

2. In a machine for translating recorded, coded indica in a document into character representations thereof, apparatus for suppressing the translation of predetermined characters comprising:

printing means operable upon receipt of a recording signal for recording a said character;

decoding means for sensing said indicia and producing a said recording signal in response to detecting designated indicia therein;

means for moving said document in sensing relation to said decoding means;

means moving in synchronization with said document for selectively producing suppression signals indicating the area of a document in which said predetermined character is to be suppressed; and signal transmission means operable in one position to convey said recording signals to said recording means and movable to a second position in response to said suppression signals to block said recording signals.

3. In a machine for translating into informational characters uniquely coded representations thereof in a document, apparatus for selectively suppressing the translation of a predetermined representation comprising:

printing means operable upon receipt of a recording signal for recording said character;

decoding means for sensing said representations and producing a said recording signal in response to said predetermined representation;

transport means for moving said document in sensing relation with said decoding means;

means snychronized with the document motion for producing a suppression signal for a selected area of said document; and signal transmission means operable in a first position for conveying said recording signal to said printing means and movable to a second position in response to said suppression signal for blocking said recording signal.

4. In a machine for translating into informational characters their uniquely coded columnar representations in a document, apparatus for selectively suppressing the translation of a predetermined character representation occurring in designated fields of columns comprising:

recording means operable in response to a recording signal for printing said predetermined character;

decoding means for sensing said representations and producing a said recording signal in response to said predetermined representation;

transport means for moving said document column by column in sensing relation with said decoding means;

gating means operable in one position for conveying said recording signal to said recording means, and operable to a second position for blocking said transmission;

means synchronized with said document motion for generating a said suppression signal for each of said fields; and means actuatable in response to said suppression signals for moving said gating means to said second position.

5. In a machine for translating columnar coded data representations in a document into informational characters corresponding thereto, apparatus for selectively suppressing the translation of a predetermined character in a document field of columns comprising:

printing means operable in response to a recording signal for printing said predetermined character;

decoding means for sensing said columnar data and generating a recording signal for each document column containing data representative of said character;

gating means operable in a first condition for transmitting said recording signal from said decoding means to said printing means and transferable to a second condition by a control signal for blocking said transmission; and synchronized means connected to said gating means for generating a said control pulse for the said column in which said translation is to be suppressed.

6. Apparatus as described in claim 5 further including means for transferring said gating means to said first condition in the absence of said control signals.

7. In a machine for translating columnar coded data representations in a document into informational characters corresponding thereto, apparatus for selectively suppressing the translation of a predetermined character in a document field of columns comprising:

printing means operable in response to a recording signal for printing said predetermined character;

decoding means for sensing said columnar data and generating a recording signal for each document column containing data representative of said character;

gating means operable in a first condition for transmitting said recording signal from said decoding means to said printing means and transferable to a second condition by a control signal for blocking said transmission, said gating means being biased for operation in said first condition; and means connected to said gating means for generating a said control pulse to overcome said bias for each said column in which said translation is to be suppressed.

8. In a machine for translating columns of coded indicia in a document into character representations thereof, apparatus for selectively suppressing the translation of a designated character comprising:

translation means including a predetermined duct arrangement therein and operable by the flow of pressurized fluid supplied thereto for sensing said columns of indicia and recording said predetermined character in response to each column containing indicia representative of said character;

means for moving said document column by column in sensing relation with said translation means;

control means synchronized with said document motion for issuing suppression signals for each of said columns in which the translation of said predetermined character is to be suppressed; and valve means interconnected in said predetermined duct arrangement and movable in response to said suppression signals for altering said duct arrangement to render said translation means inoperable.

9. Apparatus as described in claim 8 further including counteracting means to bias said valve means against movement by said suppression signals whereby said valve means restores said predetermined duct arrangement.

10. In a machine for translating columns of coded indicia in a document into character representations thereof, apparatus for selectively suppressing the translation of a designated character comprising:

translation means including a predetermined arrangement of ducts therein and operable in response to pressurized fluid supplied thereto for sensing said columns and recording said designated character for each said column containing indicia representative of said character;

means for transporting said document in sensing relation with said translating means;

control means moving in synchronization with said trasport means for generating fluid pressure suppression signals for each of said columns in a document field in which said translation is to be suppressed;

valve means interconnected in said duct arrangement and movable in response to said fluid suppression signals for modifying said duct arrangement to render said translation means inoperable; and counteracting means to bias said valve means against movement and effective in the absence of said suppression signals to restore said valve means.

11. In a machine for translating columns of coded indicia in a document field into character representations thereof, apparatus for selectively suppressing the translation of a designated character in said field comprising:

recording means operable upon receipt of a recording signal for printing said designated character;

decoding means operable for sensing the columns in said field and generating a recording signal upon detecting columnar indicia representative of said designated character;

gating means interconnected with said decoding means and operable in a first condition for transmitting said recording signal to said recording means and movable to a second condition by a suppression signal, said gating means being maintainable in said second condition by the generation of alternate suppression and recording signals;

means for moving columns of said document field successively in sensing relation with said decoding means;

means synchronized with document motion for generating said suppression signal for said gating means intermediate the sensing of two adjacent columns of said field; and bias means for said gating means effective to move said gating means to said first position upon either the failure of a suppression signal to follow a recording signal or the failure of a recording signal to follow a suppression signal for said field.

12. In a machine for translating columns of coded indicia in a document field into character representations thereof, apparatus for suppressing the translation of zeros in said field comprising:

recording means operable upon receipt of a fluid pressure recording signal for printing a zero;

decoding means operable by pressurized fluids supplied thereto for sensing said columns and generating the fluid pressure recording signal upon detecting columnar indicia representative of a zero;

valve means interconnected with said decoding means and operable in a first position for transmitting said recording signal to said recording means and movable to a second position by a suppression signal, said valve means being maintained in said second position by the generation of alternate suppression and recording signals;

means for moving columns of said document fields successively in sensing relation with said decoding means;

means synchronized with said document motion for generating fluid pressure suppression signals for said valve means intermediate the sensing of two adjacent columns in said field; and bias means for said valve means effective to move said valve means to said first position upon the failure of a suppression signal to follow a recording signal and a recording signal to follow a suppression signal for said field.

13. In a machine for translating coded indicia in a document into recorded character representations, apparatus for selectively suppressing the translation of a designated character comprising:

translation means including a predetermined duct arrangement and operable by a designated pressure differential in fluid supplied therein for sensing said document and recording said character in response to the detection of indicia representative thereof;

means for selectively generating a fluid pressure differential control signal when said character is to be suppressed;

valve means interconnected in said duct arrangement and movable in response to said control signal for altering said duct arrangement to render said translation means inoperable; and means for biasing said valve means against movement by said control signal.

14. In a machine for translating columns of coded indicia in a document field into character representations thereof, apparatus for selectively suppressing the translation of a designated character in said field comprising:

translation means including a predetermined duct arrangement and operable by the flow of pressurized fluid supplied thereto for sensing said columns and generating recording signals in recognition of indicia representing said character;

means for moving said columns of said document field successively in sensing relation with said translation means;

rotating means moving in synchronism with said document for producing a first control signal and subsequent second control pulses of pressurized fluid; and valve means interconnected with said predetermined duct arrangement and movable to a position only in response to said first control signal for altering said duct arrangement to render said translation means inoperable, and being maintainable in said position only upon the occurrence of alternate said recording and said second signals.

15. In a machine for translating columns of coded indicia in a document field into character representations thereof, apparatus for suppressing the translation of zeros in said field comprising:

valve means including a plurality of input ducts and an output duct, a chamber interconnected with said ducts, and piston means slidable within said chamber having a home position connecting a first input duct with said output duct and an actuated position connecting a second and third of said input ducts together with said chamber, said piston means being movable to said actuated position by a first suppression signal in a fourth input duct and maintained in the latter position by second suppression signals and recording signals applied in said second and third ducts;

recording means connected to said output duct and operable upon receipt of a fluid pressure recording signal for printing a zero;

decoding means connected to said first and second input ducts and operable by pressurized fluid supplied thereto for sensing said columns and generating said fluid pressure recording signal upon detecting columnar indicia represenstative of a zero;

means for moving columns of said document fields successively in sensing relation with said decoding means;

means synchronized with said document motion and connected with said third and fourth ducts for generating first and second fluid pressure suppression signals for said valve means intermediate the sensing of two adjacent columns in said field; and bias means for said valve means effective to move said piston means to said home position upon the failure of a second suppression signal to follow a recording signal and a recording signal to follow a second suppresison signal for said field.

16. In a machine for translating columns of coded indicia in a document field into character representations thereof, apparatus for suppressing the translation of zeros in said field comprising:

valve means including means forming a chamber, a plurality of ducts including an output duct, an input duct, an actuating duct and hold ducts communicating with said chamber, and piston means slidable from a home position connecting said output with said input duct to an actuated position blocking said output duct by a first suppression fluid pressure pulse in said actuating duct and maintained therein by second suppression fluid pressure pulses in said hold ducts;

recording means connected to said output duct and operable upon receipt of a fluid pressure recording signal for printing a zero;

decoding means connected to said input and one of said hold ducts and operable by pressurized fluids supplied thereto for sensing said columns and generating said fluid pressure recording signal upon detecting columnar indicia representative of a zero;

means for moving columns of said document fields successively in sensing relation with said decoding means;

means synchronized with said document motion and connected with said actuating duct and another of said hold ducts for generating said first and second fluid pressure suppression signals for said valve means intermediate the sensing of two adjacent columns in said field; and bias means for said valve means effective to move said piston means to said home position upon the failure of a second suppression signal to follow a recording signal and a recording signal to follow a second suppression signal for said field.

17. Fluid control valve apparatus comprising:

means forming a chamber;

a plurality of ducts including an output duct, an input duct, an actuating duct and hold ducts communicating with said chamber;

piston means slidable from a home position connecting said output with said input duct to an actuating position, said piston means being moved to said actuated position by a first fluid pressure pulse in said actuating duct and maintained therein by second fluid pressure pulses in said hold ducts; and means biasing said piston means toward said home position.

18. Apparatus as described in claim 17 wherein said piston means comprises two separable portions movable together to said actuated position and one of said portions returns to said home position in response to said hold pulses to block said actuating duct.

References Cited

UNITED STATES PATENTS

| | | | |
|---|---|---|---|
| 2,900,130 | 8/1959 | Lambert | 235—61.11 |
| 2,979,255 | 4/1961 | Hubl | 235—61.11 |
| 3,202,180 | 8/1965 | Gray | 137—625.15 |
| 3,226,530 | 12/1965 | Greenblott et al. | 235—61.11 |
| 3,343,481 | 9/1967 | Giannuzzi et al. | 101—93 |
| 3,366,043 | 1/1968 | Fitch | 101—93 |

WILLIAM B. PENN, *Primary Examiner.*

U.S. Cl. X.R.

137—81.5, 625.15; 235—201, 61.11